(12) United States Patent
Cole et al.

(10) Patent No.: US 9,077,212 B2
(45) Date of Patent: Jul. 7, 2015

(54) METHOD AND APPARATUS FOR ROTOR COOLING IN AN ELECTROMECHANICAL MACHINE

(75) Inventors: Trevor H. Cole, Duxbury, VT (US); Etienne Hancock, Morrisville, VT (US); Adam R. Olsen, East Corinth, VT (US)

(73) Assignee: Northern Power Systems, Inc., Barre, VT (US)

( * ) Notice: Subject to any disclaimer, the term of this patent is extended or adjusted under 35 U.S.C. 154(b) by 0 days.

(21) Appl. No.: 13/240,740

(22) Filed: Sep. 22, 2011

(65) Prior Publication Data

US 2012/0074709 A1 Mar. 29, 2012

Related U.S. Application Data

(60) Provisional application No. 61/385,667, filed on Sep. 23, 2010.

(51) Int. Cl.
| | |
|---|---|
| *H02K 9/04* | (2006.01) |
| *H02K 9/08* | (2006.01) |
| *F03D 9/00* | (2006.01) |
| *F03D 11/00* | (2006.01) |
| *H02K 1/32* | (2006.01) |
| *H02K 7/18* | (2006.01) |

(52) U.S. Cl.
CPC .. *H02K 9/04* (2013.01); *H02K 9/08* (2013.01); *F03D 9/002* (2013.01); *F03D 11/00* (2013.01); *F05B 2260/20* (2013.01); *H02K 1/32* (2013.01); *H02K 7/1838* (2013.01); *Y02E 10/722* (2013.01); *Y02E 10/725* (2013.01); *Y02E 10/726* (2013.01)

(58) Field of Classification Search
CPC ............. H02K 9/10; H02K 9/12; H02K 9/02; H02K 9/04; Y02E 10/725; Y02E 10/726
USPC .......................... 310/61, 52, 58, 59; 290/55, 44
See application file for complete search history.

(56) References Cited

U.S. PATENT DOCUMENTS

| | | | |
|---|---|---|---|
| 1,699,949 A | 1/1929 | Bucklen | |
| 4,352,034 A | 9/1982 | Karhan et al. | |
| 4,409,502 A | 10/1983 | McCabria | |
| 4,418,295 A | 11/1983 | Shiga | |
| 4,641,051 A | 2/1987 | Auinger | |
| 6,657,332 B2 | 12/2003 | Balas | |
| 6,676,122 B1 * | 1/2004 | Wobben | 290/55 |
| 7,154,192 B2 * | 12/2006 | Jansen et al. | 290/55 |

(Continued)

FOREIGN PATENT DOCUMENTS

| | | |
|---|---|---|
| DE | 19919040 A1 * | 9/2000 |
| DE | 10307813 A1 | 9/2004 |

(Continued)

OTHER PUBLICATIONS

Machine Translation, DE 10307813 A1, Sep. 9, 2004.*

(Continued)

*Primary Examiner* — Thomas Truong
(74) *Attorney, Agent, or Firm* — Downs Rachlin Martin PLLC

(57) ABSTRACT

An apparatus and method for cooling the rotor in an electromechanical machine such as a wind turbine generator is disclosed. Fluid cooling passages may be formed in the rotor, defined at least in part by a support member for magnets mounted on the rotor. Cooling fluid intake may be through the stator surrounding the rotor.

4 Claims, 6 Drawing Sheets

(56) References Cited

U.S. PATENT DOCUMENTS

| | | |
|---|---|---|
| 7,190,094 B2 | 3/2007 | Mayor |
| 7,365,447 B2 * | 4/2008 | Yoshida .......................... 290/55 |
| 7,427,814 B2 | 9/2008 | Bagepalli et al. |
| 2004/0036367 A1 * | 2/2004 | Denton et al. .................. 310/61 |
| 2006/0131985 A1 * | 6/2006 | Qu et al. ....................... 310/266 |
| 2010/0127502 A1 | 5/2010 | Uchino et al. |
| 2010/0176600 A1 * | 7/2010 | Pabst et al. ..................... 290/55 |

FOREIGN PATENT DOCUMENTS

| | | |
|---|---|---|
| EP | 1837519 A2 | 9/2007 |
| EP | 2136077 A2 | 12/2009 |
| EP | 2182611 A1 | 5/2010 |
| JP | 58065977 A * | 4/1983 ............. F03D 11/00 |
| WO | 0074215 A1 | 12/2000 |
| WO | 2010072499 A2 | 7/2010 |

OTHER PUBLICATIONS

Machine Translation, Beneke, DE 19919040 A1, Sep. 7, 2000.*

PCT International Search Report and Written Opinion dated Jul. 2, 2012 for related PCT/US2011/052892 entitled "Method and Apparatus for Rotor Cooling in an Electromechanical Machine," Trevor H. Cole, et al.

"GE Generator Rotor Design, Operational Issues, and Refurbishment Options," by Ronald J. Zawoysky and Karl C. Tornroos, GE Power Systems, GER-4212, Aug. 2001.

* cited by examiner

METHOD AND APPARATUS FOR ROTOR COOLING IN AN ELECTROMECHANICAL MACHINE

RELATED APPLICATION DATA

This application is a nonprovisional of U.S. Provisional Application No. 61/385,667, filed on Sep. 23, 2010, and titled "Method and Apparatus for Rotor Cooling in an Electromechanical Machine," which is incorporated herein by reference in its entirety.

TECHNICAL FIELD

The present invention generally relates to the field of electromechanical machines, for example, wind power generators. In particular, electromechanical embodiments of the present invention are directed to a cooling system and method for cooling a permanent magnet motor or generator.

BACKGROUND

Certain rotary machines, such as electrical power generators and electric motors, have portions that are electromagnetically active for the purpose of participating in the generation of electrical power and/or torque, depending on the type/use of machine. These machines can be very large, for example, having diameters on the order of meters and even tens of meters. Such large machines can present challenges in their construction, shipping, and installation, especially where they are constructed in locations remote from manufacturing facilities. Such large machines can also create maintenance challenges when parts of the active portions fail and need to be replaced. Proper cooling is one element of avoiding failures.

Permanent magnet ("PM") electromechanical machines utilize permanent magnets to convert rotational inputs into electricity or electrical inputs into rotational motion. One example is wind power units (WPUs) that generate electricity from the energy in wind. Generally, a PM generator or motor has three components. A first component, a stator, is a cylindrical housing that contains electrical windings that remain immobile during electricity generation. A second component, a rotor, is a rotatable assembly containing permanent magnets that spin with respect to the stator. The relative movement between the rotor and the stator produces a moving magnetic field, which induces an electrical current in the stator electrical windings, thereby producing electricity. A third component, such as an axle, bearing assembly or other arrangement depending on configuration, rotationally supports the rotor with respect to the stator, enabling the two to rotate relative to each other.

In operation, the interaction of the magnetic fields with the electrical windings generates heat that must be controlled for proper operation of the device. Large PM machines can generate significant heat that can be difficult to manage or requires complex, active cooling systems.

SUMMARY OF THE DISCLOSURE

In one implementation, the present disclosure is directed to a method for cooling a rotor in an electromechanical machine. The method includes directing cooling fluid through the rotor along an inside surface of a rotor support structure that supports rotor magnets.

In another implementation, the present disclosure is directed to a system for cooling a rotor in an electromechanical machine. The system includes a stator including a stator frame supporting a plurality of stator cores and coils; a rotor mounted for rotation within the stator, the rotor carrying a plurality of magnets on a rotor support member; and at least one rotor cooling fluid passage defined at least in part by the rotor support member.

In still another implementation, the present disclosure is directed to a system for cooling a rotor in an electromechanical machine. The system includes a stator including a stator frame supporting a plurality of stator cores and coils, and a rotor mounted for rotation within the stator, the rotor carrying a plurality of magnets on a rotor support member, the system comprising: at least one rotor cooling fluid passage defined at least in part by the rotor support member; cooling fins disposed along an inner surface of the rotor support member projecting into the at least one cooling fluid passage; a cover disposed in front of the rotor, the cover defining a space for accumulation of cooling fluid wherein the rotor cooling fluid passage communicates with the cover space to receive cooling fluid therefrom; a cooling fluid intake passage defined at least in part between the stator frame and stator cores, the intake passage communicating with the cover space; and an exhaust fan disposed in a cooling fluid exit port communicating with the rotor cooling passage.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

As will be seen, the exemplary embodiments of methods, systems, and apparatus implementing the present disclosure are varied in terms of where and how a rotor may be cooled. While a number of particular examples are presented below to illustrate the breadth of the disclosure, those skilled in the art will appreciate the large number of variations.

Figure 1A:
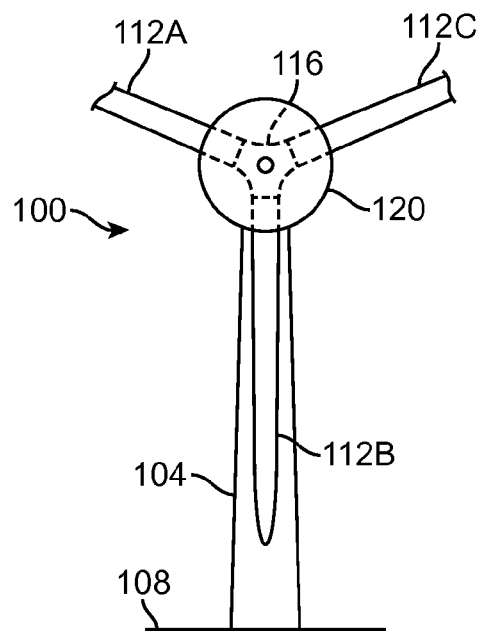
FIG. 1A is a front elevational view of a WPU.
Figure 1B:
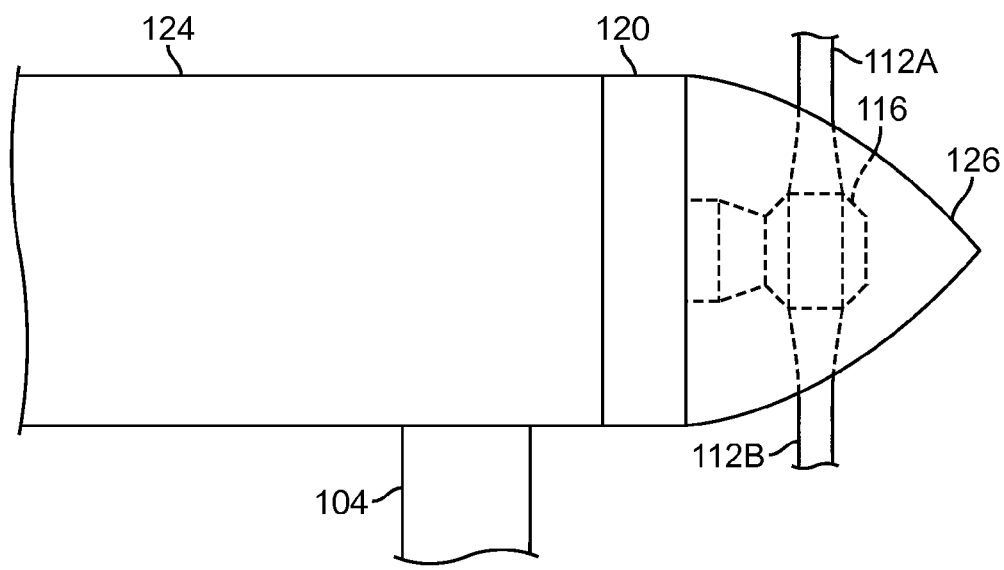
FIG. 1B is a side elevational view of a WPU.

For illustration purposes only, embodiments of the invention are described herein with reference to WPU embodiments. Persons of ordinary skill in the art will appreciate that the teachings of the present application may be equally applied to other PM machines. As depicted in FIGS. 1A and 1B, WPU 100 has a tower 104 supported by a surface 108, a number of airfoils ("blades") 112A-C connected to a hub 116, a generator 120, and a nacelle 124. Nose cone 126 may be provided. Tower 104 elevates blades 112A-C to a sufficient height above surface 108 to access wind currents that are both sufficiently strong and persistent so as to turn the blades for production of electricity. While the example depicted in FIGS. 1A and 1B has three blades, other designs may have additional blades or fewer blades. Electricity is produced by connecting a rotor to the blades via a hub and a rotational support structure, such as an axle, and enabling relative rotation between a rotor and stator.

Figure 2:
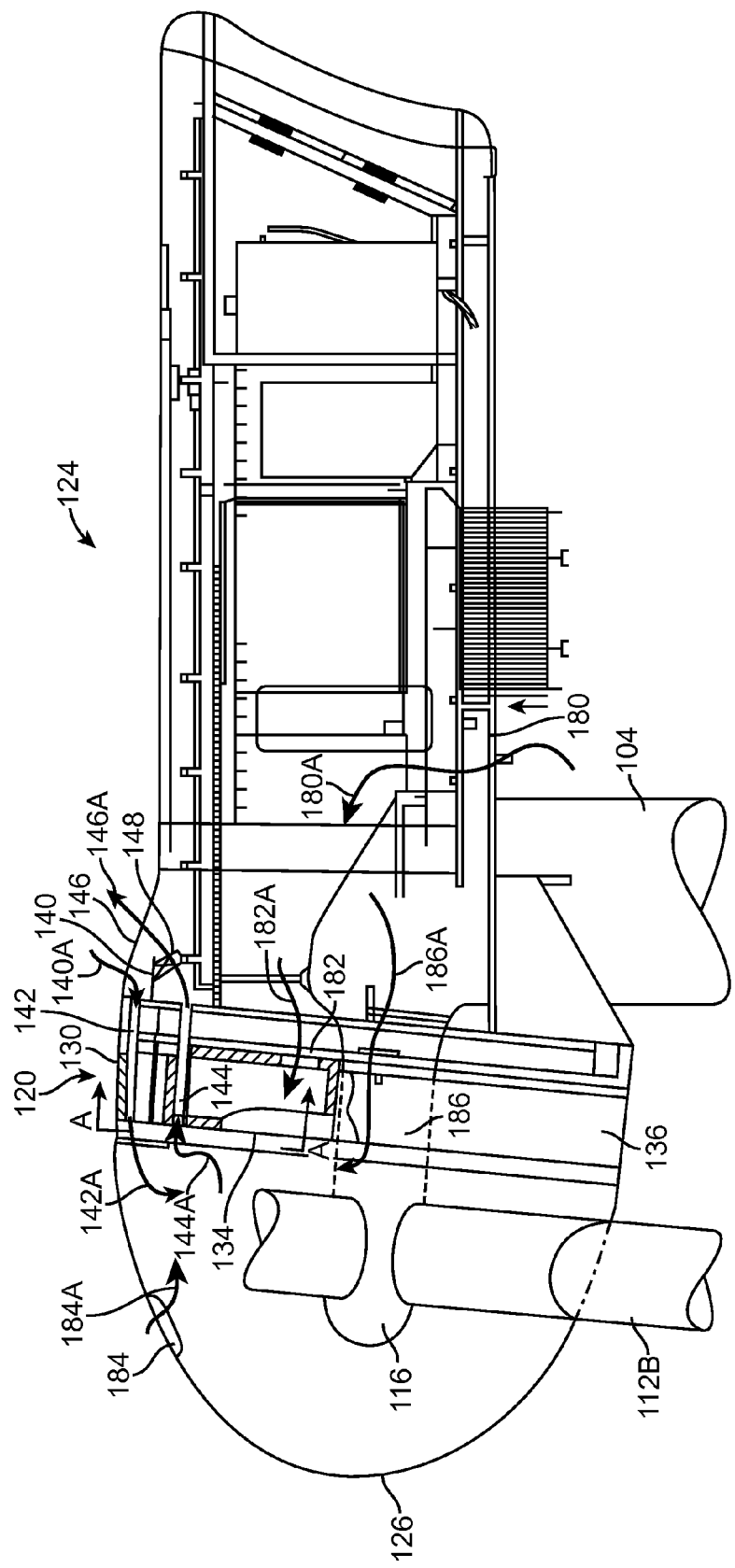
FIG. 2 is a schematic cross-sectional view of a nacelle containing generator components illustrating embodiments of the present invention.

As shown schematically in FIG. 2, generator 120 may be positioned generally forward in nacelle 124. Except as otherwise described herein, components of system employing the present invention may be conventional and configured by persons of ordinary skill in the art. Generator 120 generally includes stator 130 and rotor 134. The stator is surrounded by and supported by stator frame 136. As illustrated in FIG. 2, the top half of generator 120 is shown in cross section and the bottom half in elevation. Thus, at the top, a cross section of stator frame 136 is seen, whereas at the bottom of the figure, the outside surface of stator frame 136 is seen. The illustrated exemplary embodiment shows a rotor disposed inside a stator. Persons of ordinary skill in the art will appreciate that the present invention may be equally applied to other configurations, such as "inside-out" designs where the rotor rotates on the outside of the stator.

In one exemplary embodiment, cooling air intake 140 is disposed in the nacelle outer surface for intake of cooling air, as indicated by arrow 140A. Intake 140 communicates with stator air passage 142, formed between stator frame 136 and the stator core as discussed in more detail below. Cooling air flow from stator air passage 142, generally indicated by arrow 142A enters the space defined by nose cone 126. From this point, cooling air is drawn into rotor air passage 144 as indicated at arrow 144A. The flow of cooling air along the back side of the magnets, as shown in more detail in FIGS. 3 and 4, cools the rotor. Cooling air then exits through outlet 146 as indicated by arrow 146A.

One means for facilitating air flow in the cooling circuit as described is to utilize fan 148, positioned in outlet 146 to draw air from the nose cone 126 through rotor air passage 144. Other suitable means for facilitating such air flow may be devised by persons of ordinary skill in the art based on the teachings contained herein. For example, the structure of the rotor defining or adjacent air passage 144 may be formed at least in part as a turbine blade-type structure to help force air through the passage. Other air passages may also be provided as described below in connection with further alternative embodiments.

Figure 3:
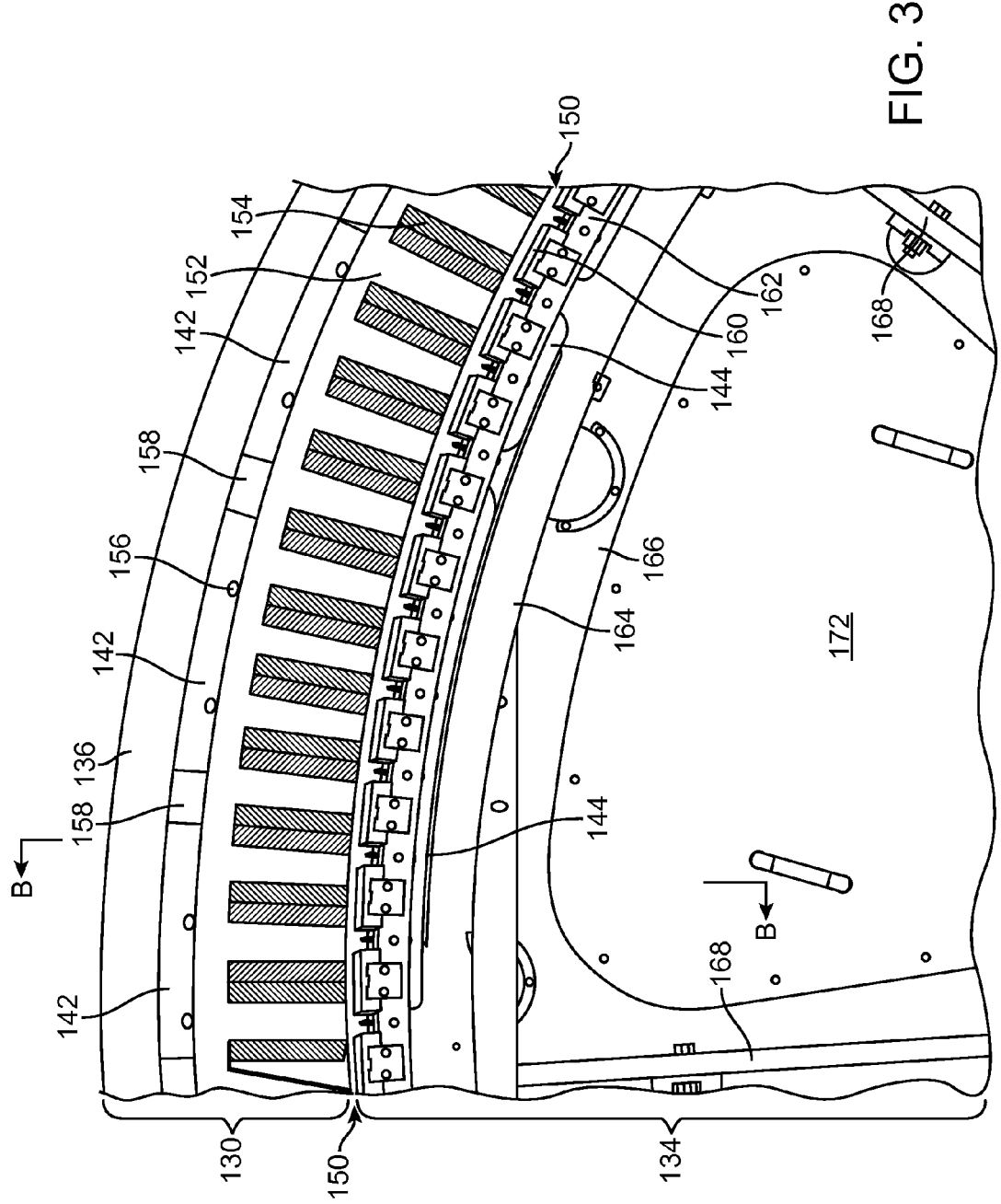
FIG. 3 is a partial elevational view of a rotor and stator according to an exemplary embodiment of the present invention as viewed along line A-A in FIG. 2.
Figure 4:
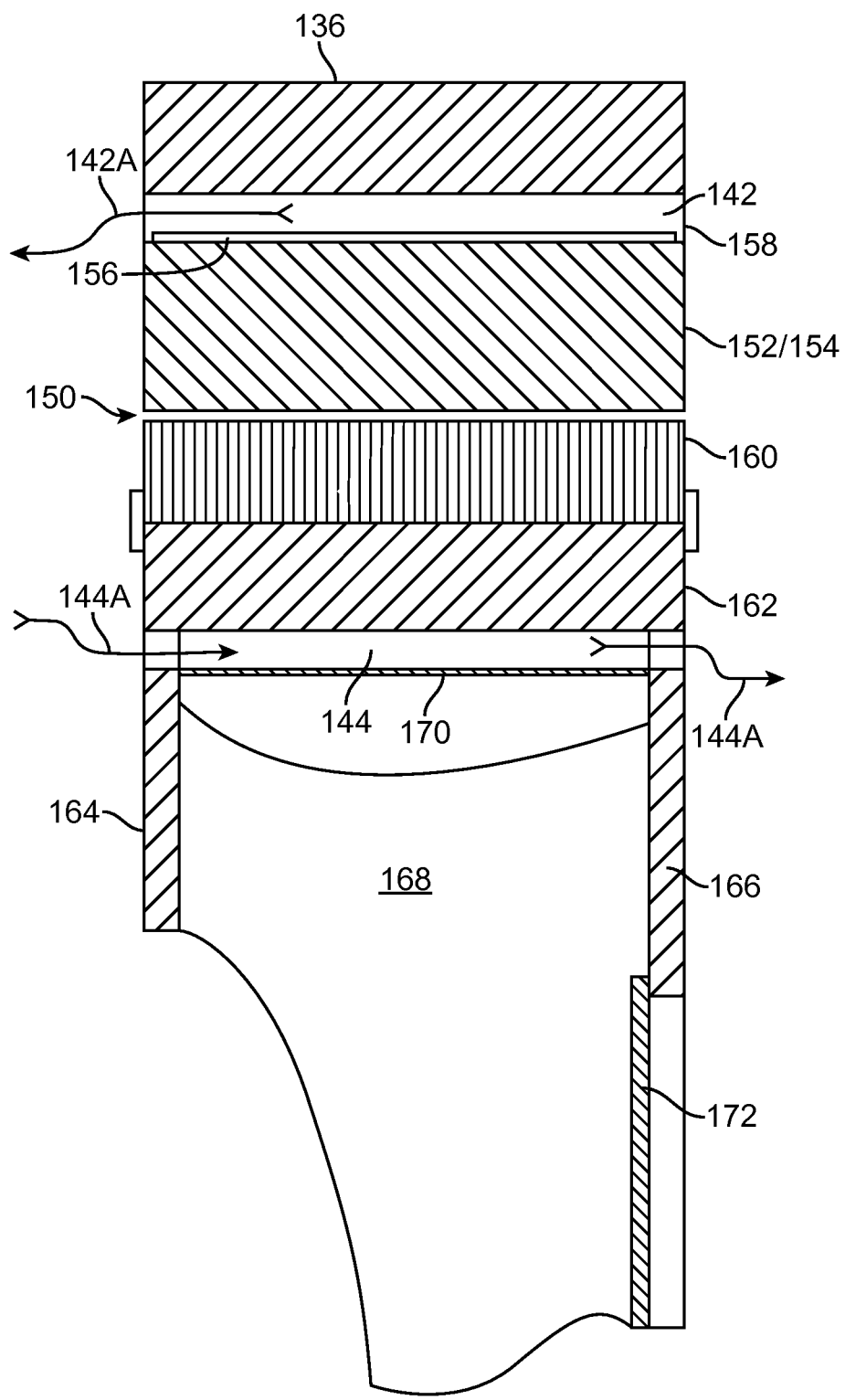
FIG. 4 is a partial cross-sectional view of the rotor and stator as in FIG. 3, viewed along line B-B.

Referring to FIGS. 3 and 4, further details of an exemplary embodiment of the invention may be appreciated. In FIG. 3, the small air gap 150, as is conventional in such machines may be seen between stator 130 and rotor 134. On the stator side, from the air gap outward, the stator may comprise cores 142 and coils 154 as will be understood by persons skilled in the art. Cooling means 156 may be provided on the back side of cores 152. Cores 152 may be spaced from and optionally secured to stator frame 136 by spacers 158 to define stator air passages 142 therebetween. Stator cooling means 156 may be conveniently disposed within passages 142, at least in part. One exemplary configuration of a stator is described in more detail in the Assignee's co-pending application, U.S. patent application Ser. No. 13/240,768, entitled ELECTROMAGNETIC ROTARY MACHINES HAVING MODULAR ACTIVE-COIL PORTIONS AND MODULES FOR SUCH MACHINES, which application is filed concomitantly herewith and incorporated by reference herein in its entirety for all purposes. Alternatively, when separate cooling means, such as means 156, are provided for stator cooling, it may be desirable to route the cooling air intake around the stator frame to the outside via appropriately devised ducting.

On the rotor side, magnets 160 may be secured by securing means as is conventionally known in the art or by means such as described in Assignee's co-pending application, Ser. No. 12/543,153, entitled METHOD AND APPARATUS FOR PERMANENT MAGNET ATTACHMENT IN AN ELECTROMECHANICAL MACHINE, filed on Aug. 18, 2009, which application is incorporated by reference herein in its entirety for all purposes. Magnets 160 are circumferentially mounted around the outside of rotor support member 162. Rotor support member 162 is in turn supported by front plate 164 and rear plate 166. The front and rear plates define staggered openings for passage 144. Passage 144 is further defined by passage cover 170, which may be a sheet metal member. The space between rotor support member 162 and passage cover 170, which corresponds to rotor air passage 144 may extend continuously around the rotor inside of rotor support member 162 without any breaks or partitions. Cooling air flow through this passage, along the inside of the rotor support member helps cool the rotor by improving conduction of heat away from magnets in the airgap. In one further alternative embodiment, as mentioned above, the surfaces defining passage 144 as described may be shaped with turbine blade-like features to help drive airflow there through.

Front plate 164 and rear plate 166 are supported radially by a series of web members 168. Web members may be formed as open spokes emanating radially from hub 116. Openings between web members may be closed with rotating cover 172, which also may be a sheet metal or plastic member. Suitable materials for structural and electromechanical members of the embodiments described herein may be selected by persons of ordinary skill in the art based on the teachings contained herein.

Alternative air flow passages may be devised by persons of ordinary skill in the art in order to direct airflow through the cooling rotor air passage 144. For example, alternative air intake 180 (see FIG. 2) may be provided in the bottom of nacelle 124 behind tower 104. From this point, cooling air may be suitably directed, as indicated by arrow 180A, to a central portion of rotor 134. A central air passage 182 may be formed through openings in rotating covers 172. Cooling air may then be directed, as indicated by arrow 182A, through the rotor centrally and into nose cone 126 where it can be redirected back through cooling passages 144 as previously described. In such an embodiment, portions of rotating cover 172 defining air passage 182 may be formed with or have added thereto fin-like structures for generating suitable air flow. Cooling air from the interior of nacelle 124 also may be ducted to nose cone 126 via a hollow spindle assembly 186, as indicated along arrow 186A. Advantages of using cooling air from the nacelle interior include the avoidance of contamination by not directly porting outside are through the generator magnets and stator windings.

In another exemplary embodiment, alternative air intakes 184 (see FIG. 2) may be provided in nose cone 126. Air flow is then directed, as indicated by arrow 184A, directly into the nose cone for use in cooling passages 144. Again, structure around intakes 184 may be configured as fin-like structures to generate increased air flow, with or without fan 148. Further air intakes may be provided through gaps that ordinarily occur between the nose cone 126 and blades 112 at the openings where the blades pass through the nose cone and/or along the trailing edge of nose cone 126 where it meets stator frame 136. These ordinarily occurring gaps may supplement other specially provided air intakes or may themselves provide sufficient air inflow without any additional special structures being provided.

Figure 5:
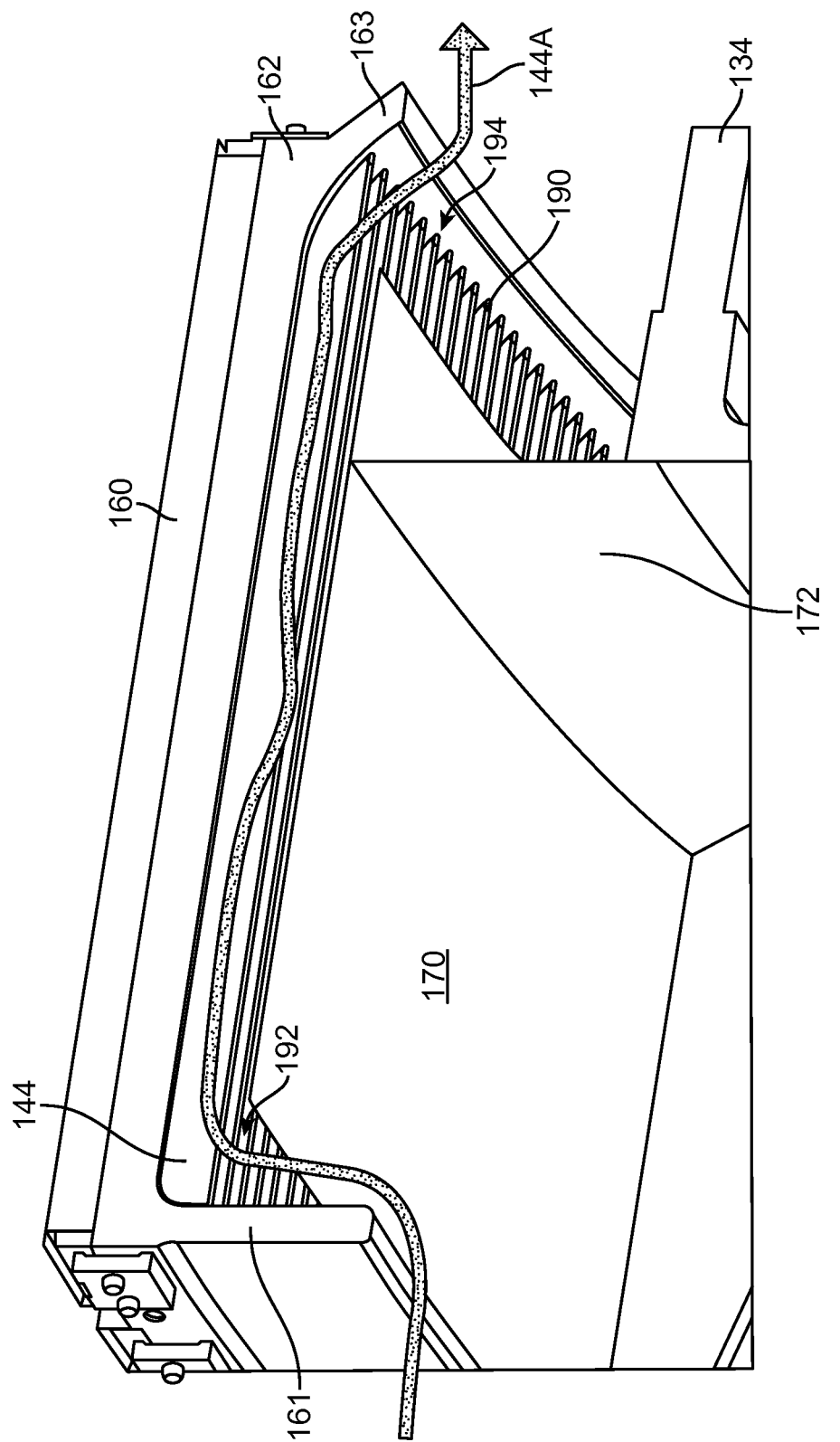
FIG. 5 is a partial cross-sectional view of an alternative embodiment of the present invention, viewed in perspective approximately at line B-B of FIG. 3.

In another alternative embodiment, shown in FIG. 5, cooling fins 190 may be disposed in passage 144 on the inside of rotor support member 162. Cooling fins 190 may add in heat transfer from the rotor to the air flowing through passage 144 as indicated by arrow 144A. In a further alternative, rather than providing openings in the front and rear plates 164, 166 for airflow passage 144 (as in the embodiment shown in FIG. 2), rotor support member 162 is provided with solid front and rear rims 161, 163. Thus, airflow is instead routed around the inside edges of the front and rear rims, through openings 192 and 194 between the rims and cover 170. Arrow 144A in FIG. 5 illustrates this airflow path.

Figure 6:
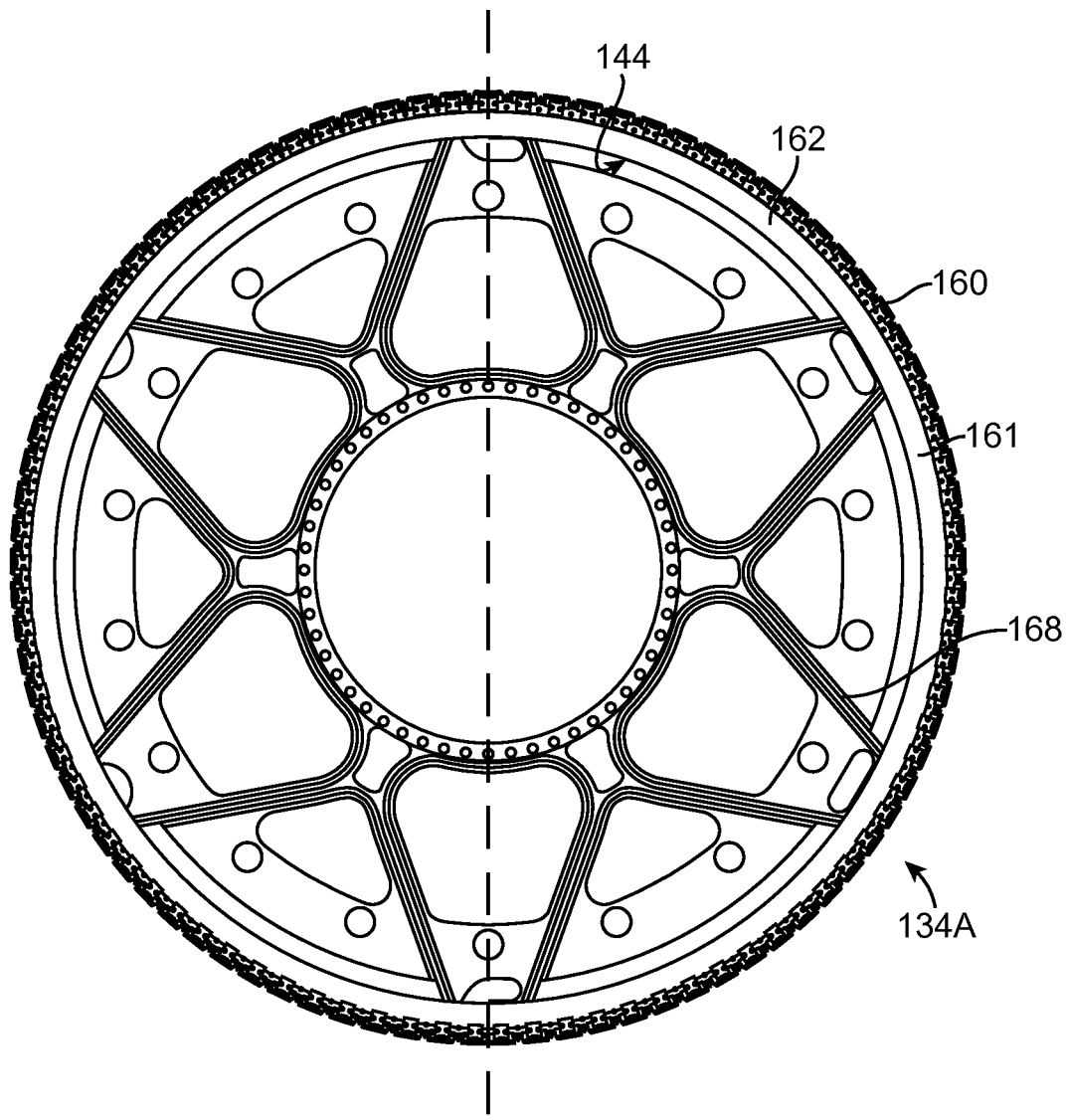
FIG. 6 is a front view of a rotor according to another exemplary embodiment of the invention, shown without airflow covers in place.

In one further embodiment, the rotor structure may be formed as a casting as shown with rotor 134A in FIG. 6. By manufacturing rotor 134A as a casting, cooling fins 190 on the inside of rotor support member 162 may be conveniently provided. However, as will be appreciated by persons skilled in art, manufacturing techniques other than casting, for example a welded assembly, also may be used to construct a rotor with (or without) cooling fins on the inside of the rotor support.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for cooling a rotor in an electromechanical machine comprising a stator including a stator frame supporting a plurality of stator cores and coils, and the rotor mounted for rotation within the stator, the rotor carrying a plurality of magnets on a rotor support member, the system comprising:
    at least one rotor cooling fluid passage defined at least in part by said rotor support member;
    cooling fins disposed along an inner surface of the rotor support member projecting into said at least one cooling fluid passage;
    a cover disposed in front of said rotor, the cover defining a space for accumulation of cooling fluid wherein said rotor cooling fluid passage communicates with said cover space to receive cooling fluid therefrom;
    a cooling fluid intake passage defined at least in part between said stator frame and stator cores, said intake passage communicating with the cover space; and
    an exhaust fan disposed in a cooling fluid exit port communicating with said rotor cooling passage, wherein:
    the electro-mechanical machine comprises a wind power unit including a generator disposed in a nacelle;
    the cover comprises a nose cone disposed in front of the generator;
    the intake passage communicates with an intake port defined in the nacelle behind the generator; and
    the exit port is defined in the nacelle behind the generator.

2. A system for cooling a rotor in an electromechanical machine, the machine having a stator including a stator frame supporting a plurality of stator cores and coils, the rotor being mounted for rotation within the stator, said rotor carrying a plurality of magnets on a rotor support member, the system comprising:
    at least one rotor cooling fluid passage defined at least in part by said rotor support member;
    a cover disposed in front of said rotor, the cover defining a cover space for accumulation of cooling fluid wherein said rotor cooling fluid passage communicates with said cover space to receive cooling fluid from the cover space;
    a cooling fluid passage defined at least in part between said stator frame and stator cores, said cooling fluid passage communicating with the cover space in front of the rotor to supply cooling fluid to the cover space;
    a cooling fluid intake configured to provide cooling fluid from outside the electromechanical machine to the cooling fluid passage defined at least in part between said stator frame and stator cores; and
    a cooling fluid outlet configured to receive cooling fluid from the rotor cooling fluid passage and exhaust the cooling fluid outside the electromechanical machine.

3. The system of claim 2, wherein said intake and said outlet are positioned behind the rotor and stator.

4. The system of claim 2, further comprising a fan positioned in said cooling fluid outlet to draw air from the rotor cooling fluid passage.

* * * * *